(12) United States Patent
Yang et al.

(10) Patent No.: US 7,513,670 B2
(45) Date of Patent: Apr. 7, 2009

(54) BACKLIGHT MODULE AND REFLECTOR THEREOF

(75) Inventors: Xing-Peng Yang, Beijing (CN); Ying-Bai Yan, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/454,550

(22) Filed: Jun. 16, 2006

(65) Prior Publication Data

US 2006/0291244 A1  Dec. 28, 2006

(30) Foreign Application Priority Data

Jun. 16, 2005  (CN) .................. 2005100353​65.9

(51) Int. Cl.
*F21V 7/04* (2006.01)
(52) U.S. Cl. .................. 362/609; 362/608; 362/615; 362/621; 362/607; 362/606; 362/610; 362/620
(58) Field of Classification Search ........... 362/608, 362/609, 615, 621, 606, 607, 610
See application file for complete search history.

(56) References Cited

U.S. PATENT DOCUMENTS

| 7,134,777 B2* | 11/2006 | Sung ................. 362/609 |
| 2005/0129357 A1* | 6/2005 | Yang et al. ............. 385/31 |
| 2006/0104091 A1* | 5/2006 | Chen et al. ............. 362/621 |

FOREIGN PATENT DOCUMENTS

| JP | 2000-184137 A | 6/2000 |
| JP | 200121881 A | 1/2001 |
| JP | 2001133779 A | 5/2001 |
| JP | 2004272055 A | 9/2004 |

\* cited by examiner

*Primary Examiner*—Stephen F Husar
*Assistant Examiner*—Jessica L McMillan
(74) *Attorney, Agent, or Firm*—D. Austin Bonderer (57) ABSTRACT

A backlight module (70) includes a light guide plate (72), a light source (74), a micro reflector array (723), and a reflector (76). The light guide plate includes a light input surface (722) facing the light source, a light output surface (724) adjacent to the light input surface, and a reflective surface (726) opposite to the light output surface. The light source and an emitting surface (744) thereof both face the light input surface. The micro reflector array and the reflector are configured for cooperatively coupling a first portion of the light beams into the light input surface via any corresponding microgap and reflecting a second portion of the light beams into the light guide plate at a location distant from the light source.

20 Claims, 7 Drawing Sheets

BACKLIGHT MODULE AND REFLECTOR THEREOF

RELATED APPLICATIONS

This application is related to commonly-assigned, co-pending application entitled, "BACKLIGHT MODULE", Ser. No. 11/499,930 filed Jun. 9, 2006. The disclosure of the above identified application is incorporated herein by reference.

BACKGROUND

1. Technical Filed

The present invention relates to a backlight module, more particularly to an edge-type backlight module used in a liquid crystal display (LCD) device.

2. Discussion of the Related Art

Liquid crystal display devices (LCDs) have been widely used as displays for notebook computers, flat-screen TVs, computer monitors, cell phones, personal digital assistants (PDAs), digital cameras, and the like. With the need for an effective backlight module for LCDs increasing, the trend for the backlight module is a lighter weight, a thinner size, a brighter illumination, a more integration, a lower fabrication cost, and a reduced power consumption. A conventional backlight module can be divided into two types, i.e., a direct type and edge type, according to the location of the light source. An edge-type backlight module in which the light source is located facing a light input surface that orthogonally adjoins a light emission surface in a given light guide plate is widely used in LCD devices. Light beams emitted from the light source are optically coupled into the light input surface, transmitting into the light guide plate, are ably reflected by the microstructure of a reflective back surface, and eventually then transmitted out from the light output surface uniformly to illuminate an LCD panel.

Figure 8:
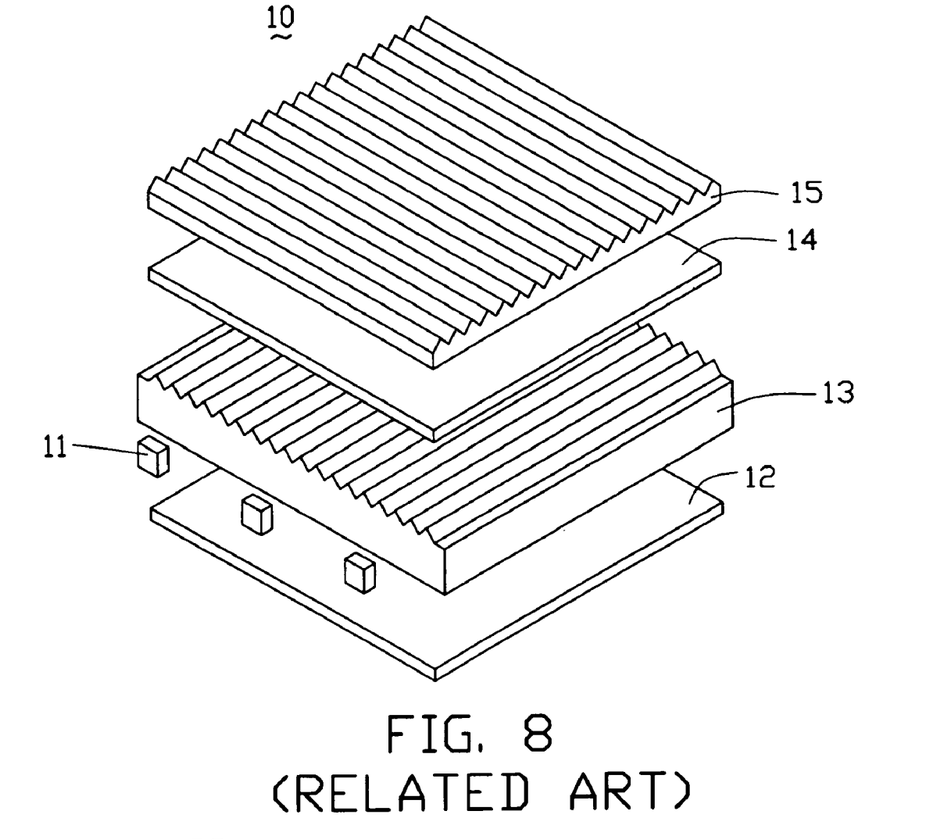
FIG. 8 is an exploded view of a conventional edge-type backlight module.

Referring to FIG. 8, a conventional backlight module 10 includes a light source 11, a light guide plate 13, a reflective plate 12, a diffusion plate 14, a prism sheet 15, and the like, wherein the light guide plate is made of a material selected from a group consisting of polymethyl methacrylate (PMMA), polycarbonate (PC), and any other suitable transparent resin material. The function of the reflective plate 12 is to reflect light beams that are not diffused back to light guide plate. The function of the diffusion plate 14 is to diffuse light beams to therefore eliminate a light column zone formed by the microstructure of the light guide plate. The function of the prism sheet 15 is to collect light beams and therefore improve the illumination.

The backlight module 10 can use, e.g., one or more cold cathode fluorescent lamps (CCFL) or a light emitting diodes (LED) as the light source 11. A small-sized backlight module usually uses at least one LED as light source and a large-sized backlight module usually uses a CCFL as light source. The function of a light guide plate is to transform a line source to a plane source when using a CCFL as the light source. However, the function of a light guide plate is to transform a point source to a plane source when using a LED as the light source. Advantages of LED over CCFL include the following. First, the LED has a long life, a bright color, and a high reliability. Second, the LED is not harmful to environment unlike the CCFL, which potentially is because of mercury in the fluorescence tube thereof. So, it may be a development trend that LEDs are used as the preferred light source of an edge-type backlight module.

Figure 9:
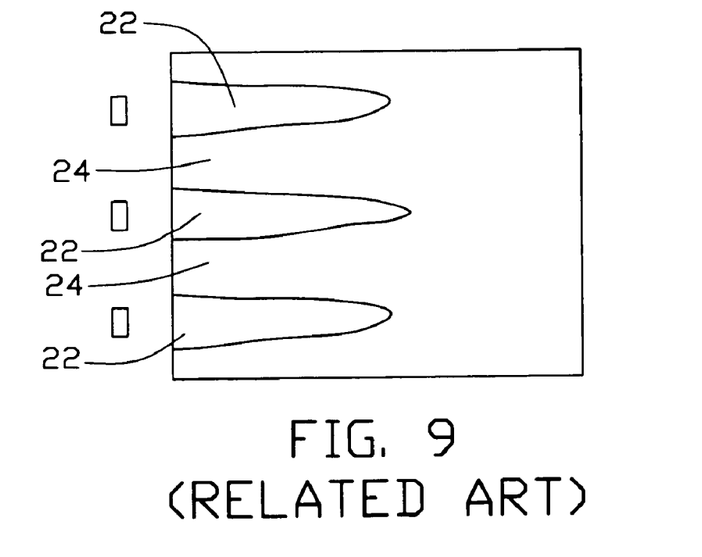
FIG. 9 is schematic view showing a light column appeared in the backlight module of FIG. 8.

Referring to FIG. 9, in which the backlight module employs an LED light source, a number of light zones 22 may be occur in areas adjacent to the light sources, and a number of dark zones 24 may appear between two given light zones 22. The light zones 22 and the dark zones 24 occur due to the light column phenomenon. This phenomenon reduces light distribution uniformity.

Figure 10:
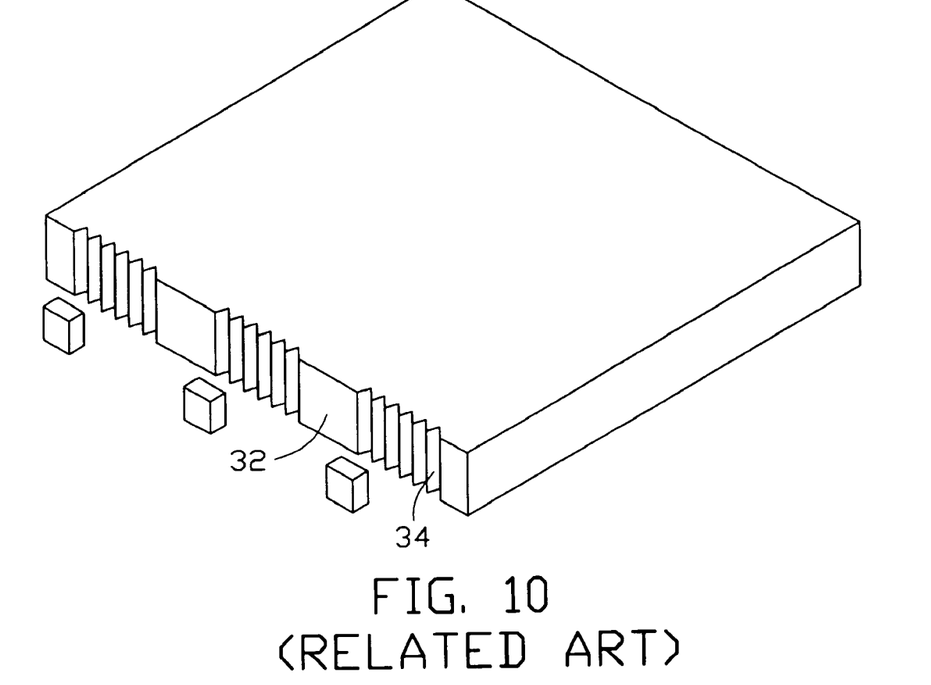
FIG. 10 is an isometric view of a light guide plate of another conventional edge-type backlight module.
Figure 11:
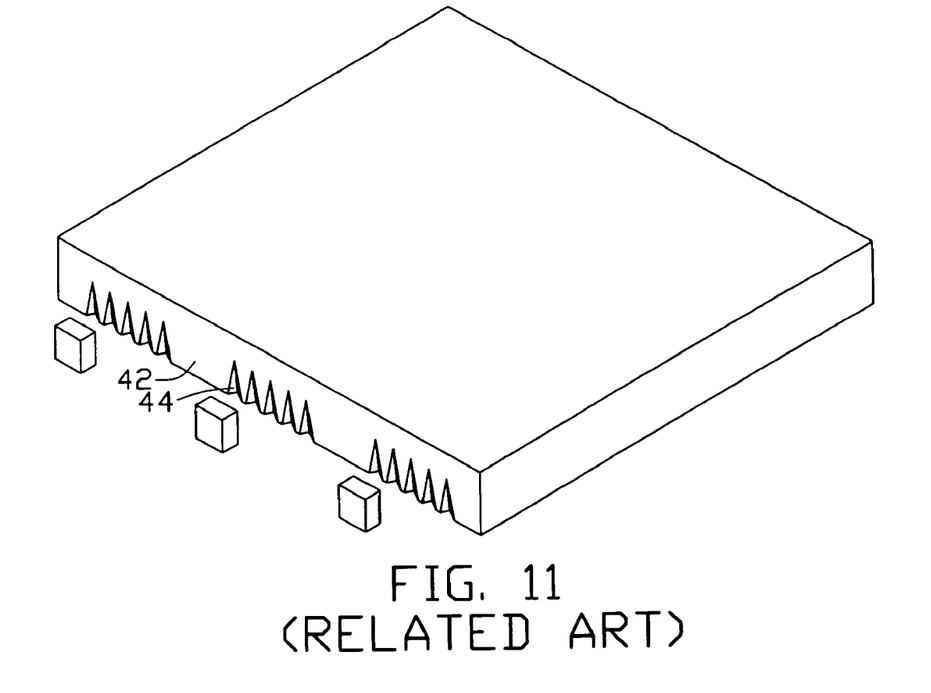
FIG. 11 is an isometric view of a light guide plate of an second conventional edge-type backlight module.

Referring to FIGS. 10 and 11, in order to solve the above problems, a sawtooth prism structure 34 or a v-cut groove structure 44 is formed on a portion of the light input surface 32 facing each of the light sources. Light beams pass through the sawtooth prism structure 34 and the v-cut groove structure 44 and then are diffused. In the configuration, the light column phenomenon may be eliminated at a certain degree. However, a portion of light beams may be reflected by the sawtooth prism structure 34 and/or the v-cut groove structure 44, so the light beams cannot transmit into the light guide plate. As such, these structures can reduce a utilization efficiency of light beams.

Figure 12:
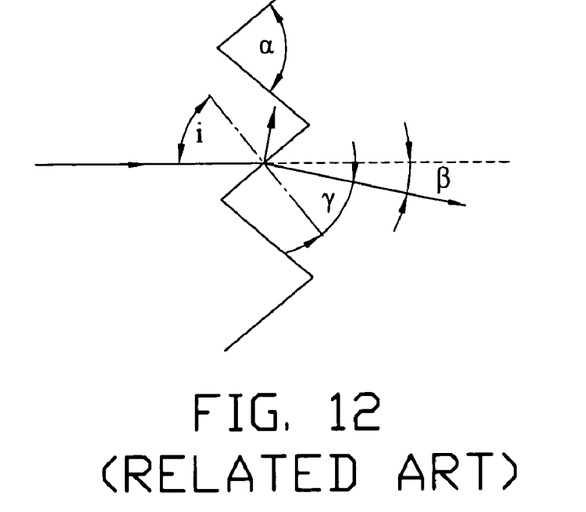
FIG. 12 is a schematic view showing that light beams being diffused by the microstructure of the light input surface of FIG. 10.

FIG. 12 is a schematic view showing that light beams are diffused by the microstructure of the light input surface of FIG. 10. The light beams are diffused by the microstructure of the light input surface of FIG. 11, which is similar in configuration with that of FIG. 10. According to the Fresnel formula, the refractive angle can be achieved according to the following arithmetic expression:

$$\beta = 90 - \alpha/2 - \arcsin\left(\frac{\sin(90 - \alpha/2)}{n}\right)$$

In that expression, $\beta$ is a refractive angle, n is refractive index of the light guide plate, and $\alpha$ is an apex of the microstructure of the light input surface. It is shown that the dark zone cannot be eliminated completely because of a limited refractive angle (i.e., the max refractive angle is less than 50 degrees, for the light guide plate made of PMMA).

Figure 13:
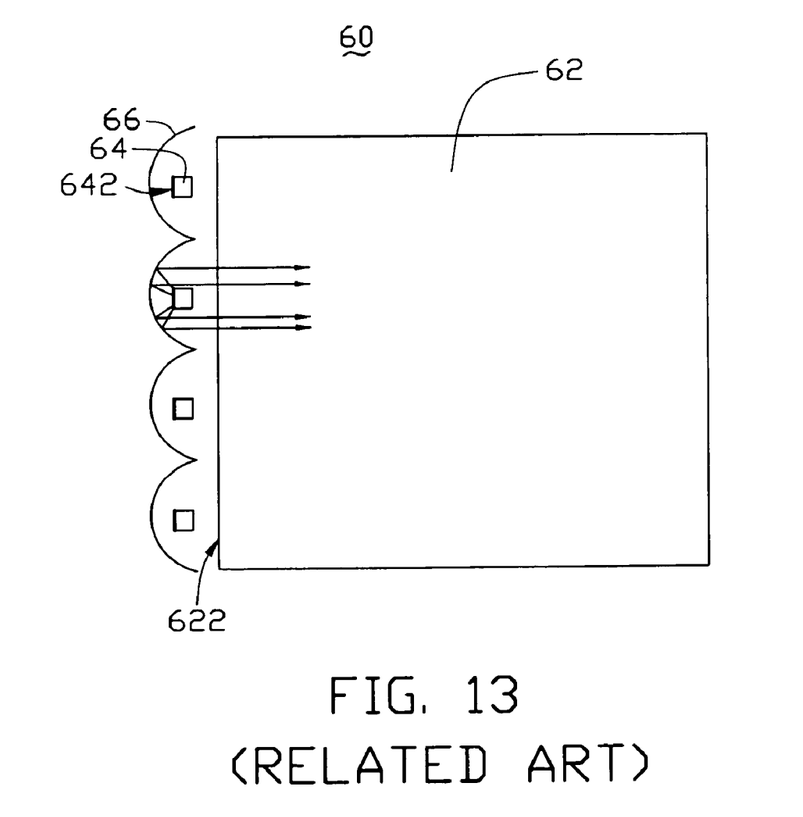
FIG. 13 is a plan view of a third conventional edge-type backlight module.

Referring to FIG. 13, another conventional back light module discloses that a number of LEDs 64 is surrounded by a number of reflectors 66 for eliminating the light column phenomenon. Each of the reflectors 66 respectively has a circle-arc section and is opposite to a corresponding LED 64. An emitting surface 642 of the LED 64 is arranged facing the reflector 66, with its back to a light input surface 622. This configuration can eliminate partly the light column phenomenon. However, the LED 64 also can shield partly the light beams reflected by the circle-arc shape reflector 66, and a dark zone can be formed on areas of the light guide plate distant from the LED 64. This configuration tends to reduce the light distribution uniformity and utilization efficiency of light energy.

Therefore, what is needed is to provide a backlight module to increase illumination uniformity, reduce the light column phenomenon, and improve light distribution uniformity and utilization efficiency of light energy.

SUMMARY

An embodiment of the present backlight module includes a light guide plate, a light source, a micro reflector array, and a reflector. The light guide plate includes a light input surface facing the light source, a light output surface orthogonally adjacent to the light input surface, and a reflective surface opposite to the light output surface. The light source and the emitting surface thereof both face the light input surface. The micro reflector array includes a number of micro reflectors on the light input surface. The micro reflectors, reflecting the light beams emitted from the light source, are substantially directed toward the light source and are spaced from one another by a microgap. The reflector arranged around the light source faces the light input surface of the light guide plate. The micro reflector array and the reflector are structured and arranged for cooperatively coupling a first portion of the light beams into the light input surface via any corresponding microgap and reflecting a second portion of the light beams into the light guide plate at a location distant from the light source. The reflector is thus adapted to reflect the light reflected by the micro reflector array back into the light guide plate in a manner that achieves improved light distribution uniformity.

An embodiment of the present backlight module comprises a light guide plate, a plurality of micro reflector arrays, a plurality of reflecting devices, and a plurality of light sources. The light guide plate includes a light input surface, a light output surface orthogonal and adjacent to the light input surface, a reflective surface opposite to the light output surface. The micro reflector arrays respectively have a number of micro reflectors formed on the light input surface of the light guide plate, and at least a part of adjacent pairs of the micro reflectors are spaced from each other by a corresponding microgap. The reflecting devices have a device reflective surface oriented toward the light input surface. The light sources are configured for emitting light beams toward the light input surface, and arranged between the respective reflecting device and the respective micro reflector array. The reflecting devices and the corresponding micro reflector arrays are structured and arranged for cooperatively coupling a first portion of the light beams into the light input surface via any corresponding microgap, and reflecting a second portion of the light beams into the light guide plate through the light input surface thereof other than the microgaps.

Other advantages and novel features of the present light guide plate and the related reflector will become more apparent from the following detailed description of preferred embodiments when taken in conjunction with the accompanying drawings.

BRIEF DESCRIPTION OF THE DRAWINGS

Many aspects of the present backlight module can be better understood with reference to the following drawings. The components in the drawing are not necessarily drawn to scale, the emphasis instead be placed upon clearly illustrating the principles of the present backlight module. Moreover, in the drawings, like reference numeral designate corresponding parts throughout the several views.

DETAILED DESCRIPTION OF PREFERRED EMBODIMENTS

Reference will now be made to the drawings to describe embodiments of the present backlight module, in detail.

Figure 1:
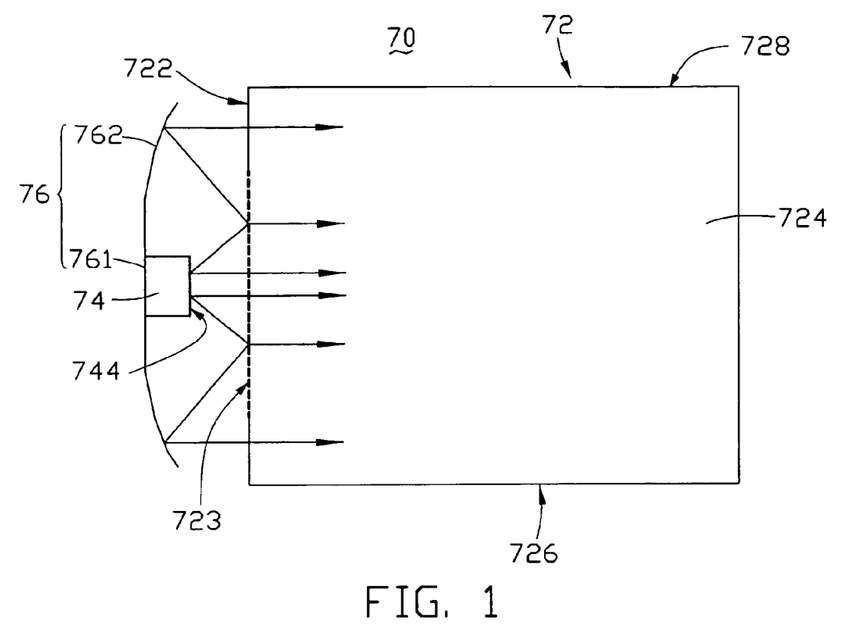
FIG. 1 is a plan view of a backlight module according to a first embodiment of the present backlight module.

FIG. 1 shows a backlight module 70 of a first embodiment. The backlight module 70 includes a light guide plate 72, a light source 74, a micro reflector array 723, and a reflector 76.

The light guide plate 72 includes a light input surface 722 located on a sidewall thereof, a light output surface 724 adjacent and orthogonal to the light input surface 722, a reflective surface (not labeled) opposite to the light output surface 724, and two sidewalls 726, 728 adjacent to the light input surface 722.

The light source 74 is arranged facing the light input surface 722 of the light guide plate 72 and has an emitting surface 744 parallel to the light input surface 722. The light source 74 in the preferred embodiment is substantially facing a center of the light input surface 722. The emitting surface 744, in particular, is oriented toward the light input surface 722 and away from the reflector 76.

The micro reflector array 723 includes a number of micro reflectors. The micro reflector array 723 is located on the center region of the light input surface 722 and is substantially directed toward the emitting surface 744 of the light source 74. The present micro reflector array 723 can be formed, e.g., by depositing a reflective film on the light input surface 722 at intervals. The film may be made of a material selected from a group consisting of silver (Ag) and aluminum (Al). A portion of light beams emitted from the light source 74 is reflected by micro reflector array 723, and another portion of the light beams passes through the microgaps of the micro reflector and then is optically coupled into the light guide plate 72.

The reflector 76 is arranged around the light source 74 and is oriented toward the light input surface 722 of the light guide plate 72. The reflector 76 includes a first concave reflective surface 761 and two second curved reflective surfaces 762 respectively extending from the two corresponding sides of the first reflective surface 761. The reflector 76 reflects light beams reflected by the micro reflector array 723 back toward the light guide plate 72 (typically a corresponding flank region thereof, given angles of reflection involved), and such light beams are thereby then are optically coupled into the light input surface 722.

The reflector 76 of the preferred embodiment can be constructed with two separate parts that respectively surround the light source 74 or with an integrally formed part that surrounds the light source 74. The reflector 76 has a smooth curved reflective surface. The reflective surface of the reflector 76 may, e.g., be made of a material selected from a group consisting of silver (Ag) and aluminum (Al). The reflector 76 may be assembled together with an LED light source acting as the light source 74 for light guide plate 72. The primary function of the reflector 76 is to adjust the light energy distribution and to therefore achieve the uniform illumination on the light input surface 722.

A portion of the light beams emitted from the light source 74 passes through the microgaps of the micro reflector and is optically coupled into the light guide plate 72, and another portion of the light beams reflected by micro reflector array 723 is ultimately again reflected, this time by the reflector 76, and then optically coupled into the light guide plate 72 at a location a lateral distance away from the light source 74. Specifically, via the micro reflector array 723 and the reflector 76, a portion of the light beams emitted from the light source 74, according to the preferred embodiment, is transferred from the area adjacent to the light source to the area away from the light source. This process eliminates the light column phenomenon and thus improves the light distribution uniformity and utilization efficiency of light energy.

Figure 2:
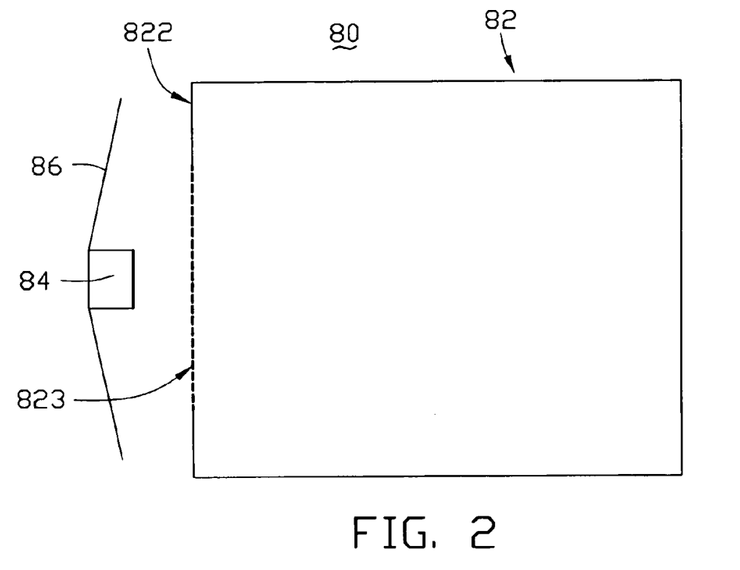
FIG. 2 is a plan view of a backlight module according to a second embodiment of the present backlight module.

FIG. 2 shows a backlight module 80 according to a second embodiment. The backlight module 80 includes a light guide plate 82, a light source 84, a micro reflector array 823, and a reflector 86. The light source 84 is oriented toward the light input surface 822 of the light guide plate 82. The backlight module 80 of this preferred embodiment is the same as the first embodiment, except that the reflector 86 forms a first concave reflective surface and two second slanted plane reflective surfaces extending from the corresponding two sides of the first reflective surface, respectively. The function of the reflector 86 is to reflect the light beams reflected by the micro reflector array 823 back to the light guide plate 82 and to couple the reflected light beams into the light input surface 822.

Figure 3:
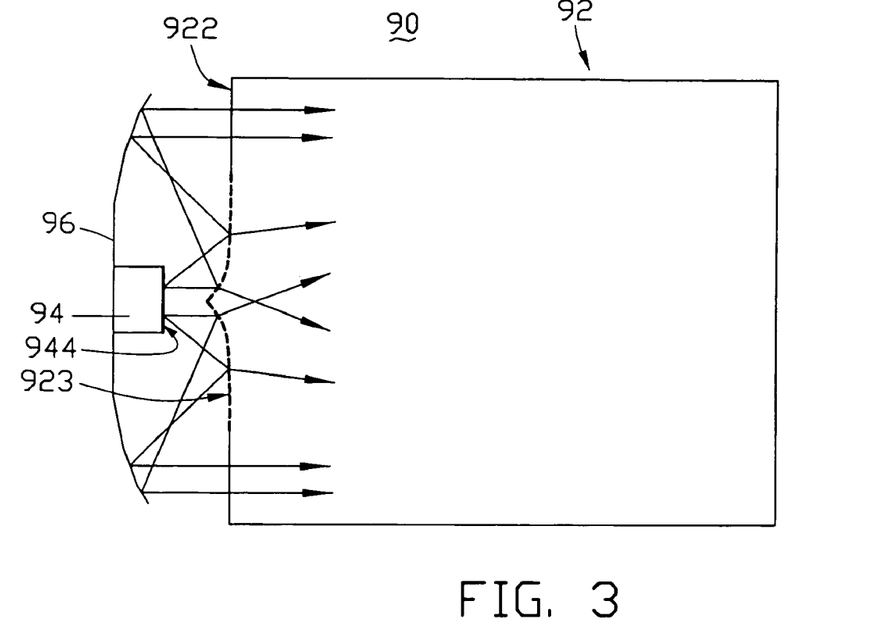
FIG. 3 is a plan view of a backlight module according to a third embodiment of the present backlight module.

FIG. 3 shows a backlight module 90, according to a third embodiment. The backlight module 90 includes a light guide plate 92, a light source 94, a micro reflector array 923, and a reflector 96. The light source 94 is arranged facing the light input surface 922 of the light guide plate 92. The backlight module 90 of this preferred embodiment is the same as the first embodiment; except that a portion of the light input surface 922, substantially facing the emitting surface 944, forms a protrusion structure defining two adjoining concave-curved surfaces. The micro reflector array 923 is located on the protrusion. This configuration reduces the brightness of the area of the light input surface adjacent to the light source 94.

Figure 4:
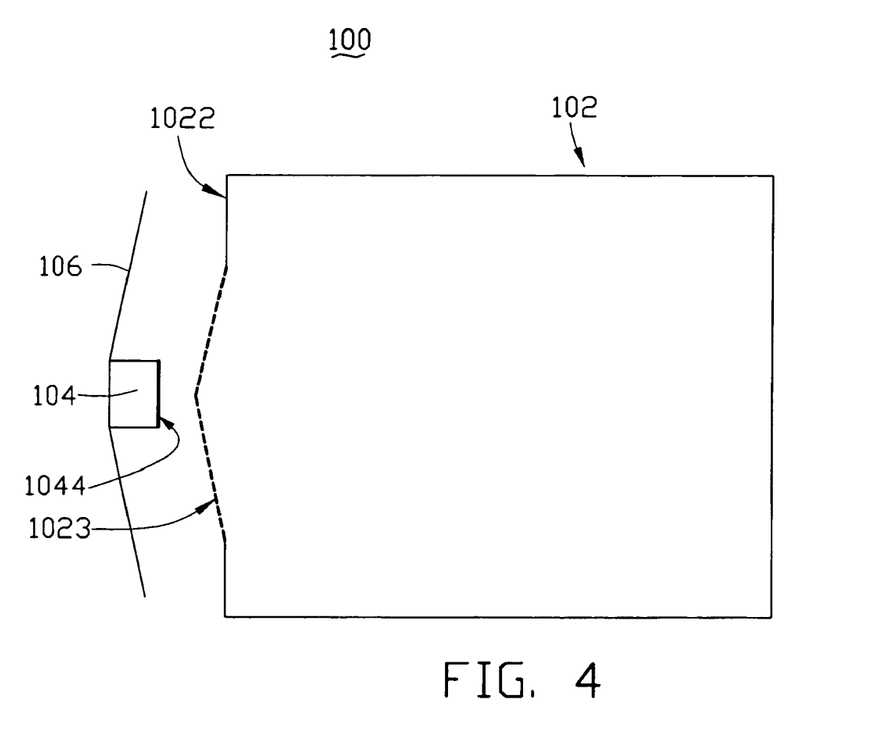
FIG. 4 is a plan view of a backlight module according to a fourth embodiment of the present backlight module.

FIG. 4 shows a backlight module 100 of a fourth embodiment. The backlight module 100 includes a light guide plate 102, a light source 104, a micro reflector array 1023, and a reflector 106. The light source 104 is adjacent to the light input surface 1022 of the light guide plate 102. The backlight module 100 of this preferred embodiment is the same as the second embodiment, except that a portion of the light input surface 1022 substantially facing the emitting surface 1044 forms a protrusion structure incorporated two oppositely slanted plane surfaces, which join to form the protrusion apex. The micro reflector array 1023 is located on the protrusion. This configuration reduces the brightness of the area of the light input surface adjacent to the light source 104.

The protrusion structures of the third and the forth embodiments may be in any other shape. This set-up advantageously can reduce the brightness of the area of the light input surface adjacent to the light source. This configuration particularly transfers a portion of light energy from the area adjacent to the light source to the area distant from the light source. The micro reflector array partly eliminates the light column phenomenon and achieves the light distribution uniformity on the light input surface. Thus, good uniformity and good luminance are more effectively achieved.

Figure 5:
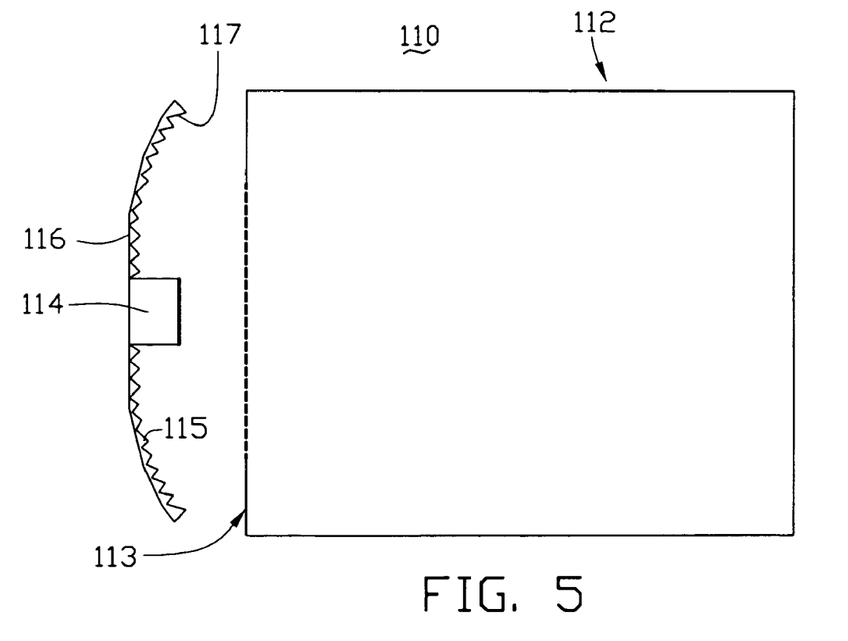
FIG. 5 is a plan view of a backlight module according to a fifth embodiment of the present backlight module.

As known of the brightness distribution of the light source, the structure of the reflector may be optimized (e.g., light diffracting and/or diffusing elements may be provided thereon) to further improve the illumination uniformity. FIG. 5 shows a fifth embodiment of the present backlight module 110. The backlight module 110 includes a light guide plate 112, a light source 114, a micro reflector array 113, and a reflector 116. The backlight module 110 of this preferred embodiment is the same as the first embodiment, except that the reflective surface of the reflector 116 has a light manipulating (e.g., diffracting and/or diffusing) array 115, in the form of a plurality of v-shaped convexities, thereon. The brightness distribution on the light input surface 113 may be adjusted by controlling the size, shape, and/or density of the v-shaped convexities. It is understood that the reflective surface is not limited to the v-shape convexities shown, as other microstructures such as v-shaped groove (i.e., concavity) and dot structure are also suitable for the light manipulating array 115 on the reflective surface of the reflector 116 of this preferred embodiment.

It is to be understood that the reflective surfaces of the two reflectors from the second to the fourth preferred embodiment may, like the fifth embodiment, incorporate light manipulating microstructures, in any various suitable shape, thereon.

Figure 6:
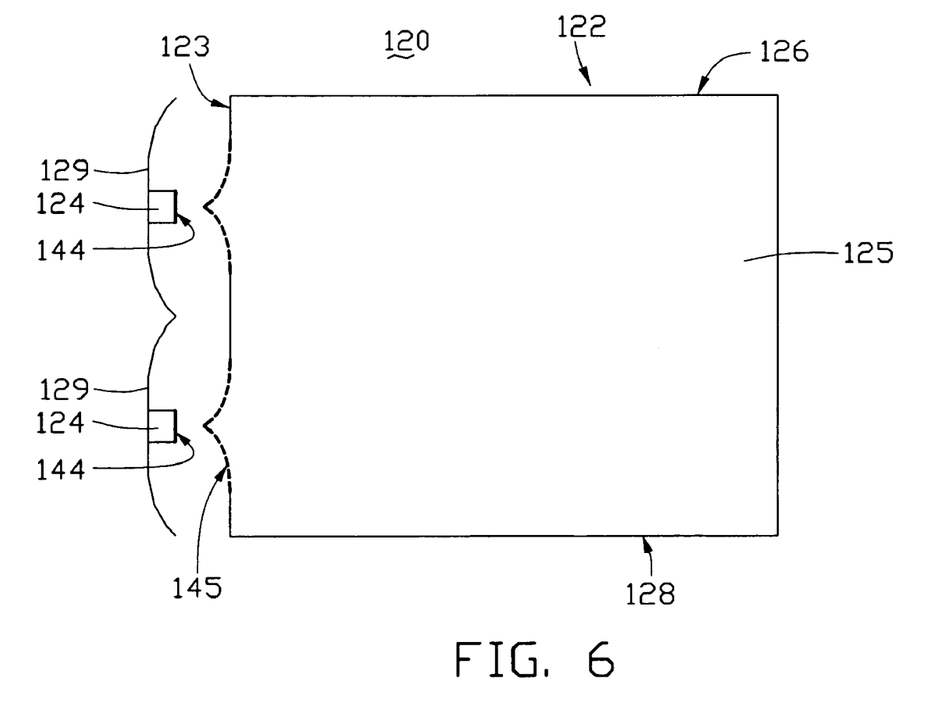
FIG. 6 is a plan view of a backlight module according to a sixth embodiment of the present backlight module.

FIG. 6 shows a backlight module 120 according to a sixth embodiment. The backlight module 120 includes a light guide plate 122, two light sources 124, two micro reflector arrays 145, and two reflectors 129. The light guide plate 122 includes a light input surface 123 located on the sidewall of light guide plate 122, a light output surface 125 orthogonal and adjacent to the light input surface 123, a reflective surface (not labeled) opposite to the light output surface 125, and two sidewalls 126, 128 of light guide plate 122, adjacent to light input surface 123. The two light sources 124 are directed toward the light input surface 123. Each of the light sources 124 includes an emitting surface 144 oriented toward the light input surface 123. Each portion of light input surface 123, in turn, substantially facing the emitting surface 114 forms a respective protrusion structure, each such protrusion being defined by an apex-forming, two-curved surface. The micro reflector arrays 145 are located on each corresponding protrusion. Each of the reflectors 129 is arranged around one corresponding light source 124. Further, each reflector 129 forms a first concave reflective surface and two second curved reflective surfaces extending from the respective two sides of the first reflective surface, respectively, similar to the first embodiment. The function of the reflector 129 is to reflect the light beams reflected from the micro reflector array 145 back to the light guide plate 122 and couple the reflected light beams into the light input surface 123 thereof. The two reflectors 129 work together to reflect the light beams emitted from two light sources 124, not directly transmitted through the two micro reflector arrays 145, back to the light input surface 123. The reflective surfaces of the two reflector of this preferred embodiment may incorporate any kind of light manipulating microstructure, in a manner similar to that described above.

Figure 7:
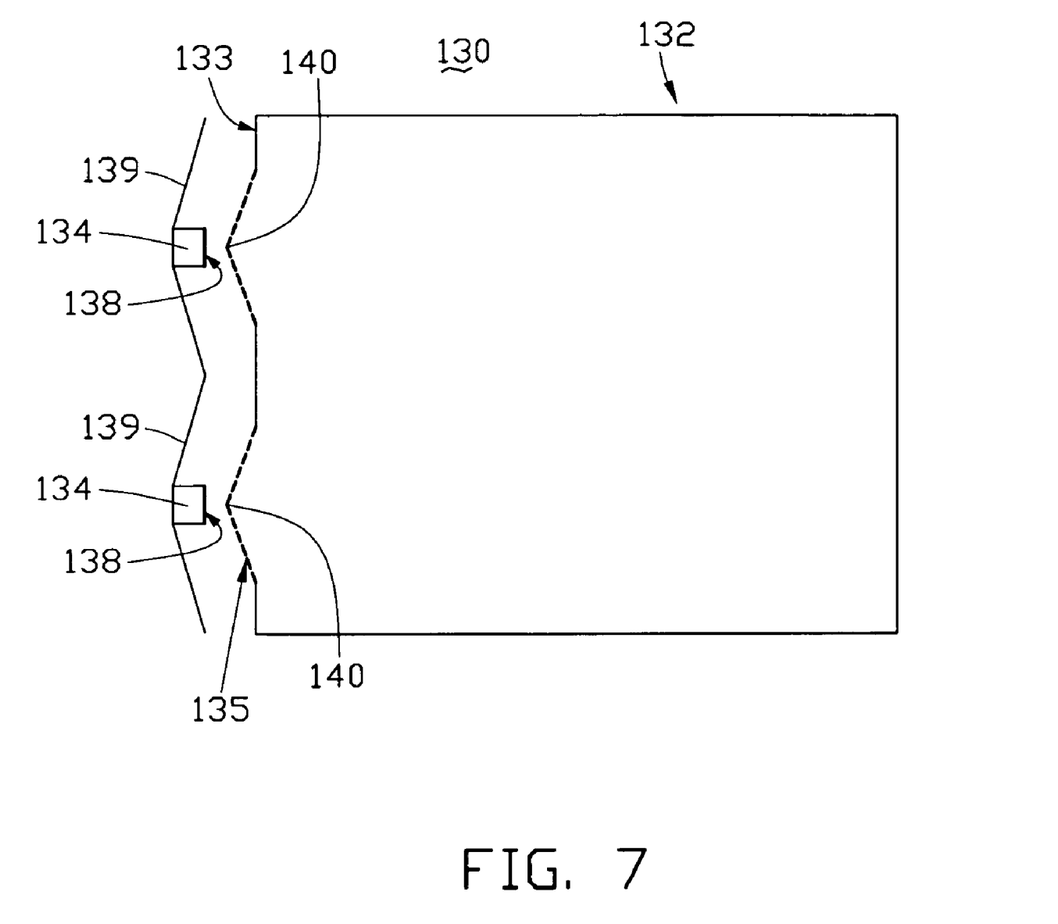
FIG. 7 is a plan view of a backlight module according to a seventh embodiment of the present backlight module.

FIG. 7 shows a seventh embodiment of the present backlight module 130. The backlight module 130 includes a light guide plate 132, two light source 134, two reflectors 139 arranged around light sources 134, and two micro reflector arrays 135. The backlight module 130 of this preferred embodiment is the same as the sixth embodiment, except that each smooth-surface reflector is arranged around the respective light sources 134 and faces the light input surface 133. Each reflector 139 forms a first concave reflective surface and two second slanted, planar reflective surfaces respectively extending from two sides of the first reflective surface, with the reflectors 139 adjoining one another to make an effectively continuous reflective surface, like in the sixth embodiment. The function of the reflector 139 is to reflect the light beams reflected from the micro reflector array 135 back toward the light guide plate 132 and then couple the light beams into the light input surface 133. Each portion of the light input surface 133 that is substantially oriented toward the emitting surface 138 establishes a protrusion structure 140. Each such structure includes two oppositely slanted plane surfaces that together form a protrusion apex. The micro reflector array 135 is located on the protrusion. The function of the reflector 139 is to reduce the brightness of the area adjacent to the light source. The reflective surfaces of two reflectors 139 of this preferred embodiment may include any kinds of light-altering microstructures, instead of being entirely smooth.

The light input surface 133 of this preferred embodiment with the two light sources may, instead, be planar in shape, similar with the first embodiment. Alternatively, the protrusion of the light input surface may be of any other of shape that promotes the desired functionality thereof. Particularly, the function of the protrusion is to reduce the brightness of the area adjacent to the light source and to transfer a portion of light energy from the area adjacent to the light source to the area away from the light source. This configuration can advantageously promote uniform light distribution, eliminate the light column phenomenon, and improve the illumination uniformity and the utilization efficiency of light energy.

According to the present backlight module, a first microstructure may be formed on the reflective surface, the light output surface, or the assembly of two surfaces so as to control the direction of the light beams transmitting out therefrom. The first microstructure may be, e.g., in a shape of a triangle apex strip, an obtuse apex strip, a semicircle apex strip, a microdot, and the like. A second microstructure may be formed on the light input surface to improve the distribution uniformity of light input. The second microstructure may be in shape of a sawtooth prism, a v-cut groove, and the like. The backlight module may further include a reflective sheet under the reflective surface (i.e., the bottom surface of the light guide plate) for improving the light output ratio and/or a diffusion sheet upon the light output surface for improving the light distribution uniformity. The shape of light guide plate may be flat or wedge-shaped. The light guide plate is beneficially made of a material selected from a group consisting of polymethyl methacrylate (PMMA), polycarbonate (PC), and any other suitable transparent resin material.

As mentioned above, the backlight module may be provided with at least one light source adjacent to the light input surface. The light input surface is substantially faces the emitting surface of light source. The reflector and the micro reflector array work together to reflect a portion of the light beams originating at a given light source and to then couple such reflected light beams into the light input surface, generally at a lateral distance away from the light source of their origin. The configuration mentioned above can help to avoid the formation of alternating light column zones and dark zones. The advantage of the present backlight module is that it helps to improve the illumination uniformity and the utilization efficiency of light energy.

Finally, it is to be understood that the embodiments mentioned above are intended to illustrate rather than limit the invention. Variations may be made to the embodiments without departing from the spirit of the invention as claimed. The above-described embodiments illustrate the scope of the invention but do not restrict the scope of the invention.

What is claimed is:
1. A backlight module comprising:
a light guide plate having a light input surface, a light output surface adjacent and perpendicular to the light input surface, and a plate reflective surface opposite to the light output surface;
a reflecting device having a device reflective surface, the device reflective surface facing the light input surface of the light guide plate;
a light source facing the light input surface of the light guide plate and configured for emitting light beams toward the light input surface of the light guide plate; and
a micro reflector array comprising a plurality of micro reflectors formed on the light input surface of the light guide plate, the micro reflector array and the reflecting device being structured and arranged for cooperatively coupling a first portion of the light beams into the light input surface via any corresponding microgap and reflecting a second portion of the light beams into the light guide plate at a location distant from the light source.

2. The backlight module as claimed in claim 1, wherein the reflecting device comprises a first concave reflective surface and two second curved reflective surfaces extending from two respective sides of the first reflective surface.

3. The backlight module as claimed in claim 1, wherein the light input surface comprises a protrusion structure adjacent and facing the light source.

4. The backlight module as claimed in claim 3, wherein the protrusion stricture includes two oppositely-curved concave surfaces.

5. The backlight module as claimed in claim 3, wherein the protrusion structure includes two oppositely-slanted surfaces.

6. The backlight module as claimed in claim 3, wherein the micro reflector array is located on the protrusion.

7. The backlight module as claimed in claim 1, wherein an emitting surface of the light source faces away from the reflector and toward the light input surface.

8. The backlight module as claimed in claim 1, wherein the reflecting device forms a first concave reflective surface and two second slanted plane reflective surfaces respectively extending from two sides of the first reflective surface.

9. The backlight module as claimed in claim 1, wherein the reflecting device comprises a plurality of microstructures formed on the device reflective surface thereof.

10. The backlight module as claimed in claim 9, wherein at least one microstructure is shaped into one of a V-shaped concavity, a V-shaped convexity, and a microdot shape.

11. The backlight module as claimed in claim 1, wherein the light guide plate is flat shape or wedge shape.

12. A backlight module comprising:
a light guide plate having a light input surface;
a plurality of micro reflector arrays each comprising a plurality of micro reflectors formed on the light input surface of the light guide plate, at least a part of adjacent pairs of the micro reflectors being spaced from each other by a corresponding microgap;
a plurality of reflecting devices each having a device reflective surface facing the light input surface of the light guide plate; and
a plurality of light sources facing the light input surface of the light guide plate and configured for emitting light beams toward the light input surface of the light guide plate, the light sources each being arranged between the respective reflecting device and the respective micro reflector array; wherein, the reflecting devices and the corresponding micro reflector arrays are structured and arranged for cooperatively coupling a first portion of the light beams into the light input surface via any corresponding microgap and reflecting a second portion of the light beams into the light guide plate through the light input surface thereof other than the microgaps.

13. The backlight module as claimed in claim 12, wherein the light guide plate comprises a plurality of protrusion structures formed on the light input surface thereof, the protrusion structures being arranged spatially corresponding to the respective light sources.

14. The backlight module as claimed in claim 13, wherein each of the protrusion structures includes two oppositely-curved concave surfaces.

15. The backlight module as claimed in claim 13, wherein each of the protrusion structures includes two oppositely-slanted surfaces.

16. The backlight module as claimed in claim 13, wherein the micro reflector arrays are formed on the respective protrusion structures of the light guide plate.

17. The backlight module as claimed in claim 12, wherein the each reflecting device comprises a first concave reflective surface and two second curved reflective surfaces extending from two respective sides of the first reflective surface.

18. The backlight module as claimed in claim 12, wherein the each reflecting device forms a first concave reflective surface and two second slanted plane reflective surfaces respectively extending from two sides of the first reflective surface.

19. The backlight module as claimed in claim 12, wherein the each reflecting device comprises a plurality of microstructures formed on the device reflective surface thereof.

20. The backlight module as claimed in claim 19, wherein at least one microstructure is shaped into one of a V-shaped concavity, a V-shaped convexity, and a microdot shape.

* * * * *